United States Patent [19]

Abadia

[11] Patent Number: 5,924,897
[45] Date of Patent: Jul. 20, 1999

[54] DEVICE FOR MECHANICALLY ASSEMBLING AND ELECTRICALLY CONNECTING TOGETHER TWO SUBASSEMBLIES OF AN ALTERNATOR, IN PARTICULAR FOR A MOTOR VEHICLE

[75] Inventor: Roger Abadia, Neuilly/Plaisance, France

[73] Assignee: Valeo Equipment Electriques Moteur, Creteil, France

[21] Appl. No.: 08/951,344

[22] Filed: Oct. 16, 1997

[30] Foreign Application Priority Data

Oct. 16, 1996 [FR] France .................................. 96 12609

[51] Int. Cl.$^6$ .................................................. H01R 39/02
[52] U.S. Cl. .......................................................... 439/699.1
[58] Field of Search .................................. 439/699.1, 27, 439/38, 660, 34, 883, 866, 723

[56] References Cited

U.S. PATENT DOCUMENTS 5,268,605  12/1993  Bradfield .................................. 310/71

FOREIGN PATENT DOCUMENTS

2629287  9/1989  France .

*Primary Examiner*—Gary F. Paumen
*Assistant Examiner*—Alexander Gilman
*Attorney, Agent, or Firm*—McCormick, Paulding & Huber

[57] ABSTRACT

The invention relates to a motor vehicle alternator and a device for mechanically assembling and electrically connecting together two subassemblies thereof. One of the subassemblies includes at least two first conductors mounted on a support, and the other subassembly includes at least two second conductors mounted on a support and designed to be connected to the first conductors. The supports of the first and second subassemblies include fittings co-operating with a fastener which maintains pressure between contacts of the respective conductors. Contacts are provided in the vicinity of one another on fittings that are suitable for receiving a single fastener and, according to the invention, corresponding contacts of the first conductors and of the second conductors are arranged circumaxially around an assembly member.

8 Claims, 5 Drawing Sheets

FIG_3

FIG_7

DEVICE FOR MECHANICALLY ASSEMBLING AND ELECTRICALLY CONNECTING TOGETHER TWO SUBASSEMBLIES OF AN ALTERNATOR, IN PARTICULAR FOR A MOTOR VEHICLE

The present invention relates in general to devices for simultaneously mechanically assembling and electrically connecting together two subassemblies of an alternator, in particular an alternator for a motor vehicle.

It relates more particularly, but not exclusively, to mechanical assembly and electrical interconnection of a rectifier subassembly and a regulator and brush-support subassembly of such an alternator.

BACKGROUND OF THE INVENTION

Figure 1:
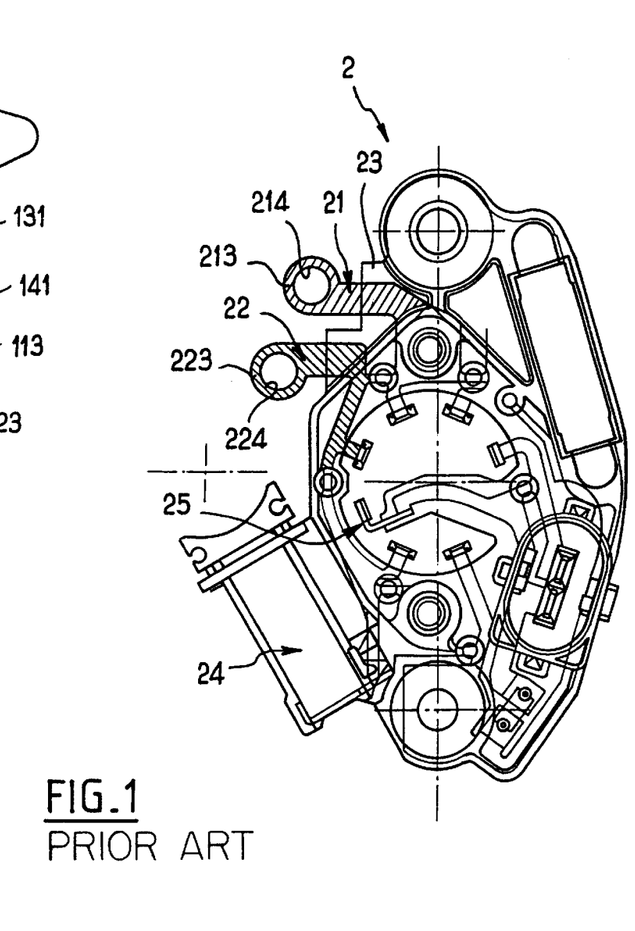
FIG. 1 is an exploded plan view of a rectifier subassembly and of a regulator subassembly of a prior art alternator.

FIG. 1 is an exploded plan view of two prior art subassemblies of this type.

The rectifier subassembly 1 is designed to be mechanically and electrically associated with the regulator subassembly 2, the electrical connection between the two subassemblies having two terminals carrying the output voltage from the rectifier bridge (itself generally of the three-phase type).

The rectifier subassembly conventionally comprises a body or structure of insulating material 13, a plurality of rectifier diodes (not shown), and a positive conductor 11 and a negative conductor 12 connected to the various diodes.

In conventional manner, the positive and negative conductor 11 and 12 include diode connection fittings respectively referenced 111 and 121, and stator conductor connection fittings respectively referenced 112 and 122.

For the purposes of mechanically assembling and electrically connecting together the rectifier subassembly 1 and the regulator subassembly 2, the positive conductor 11 of the rectifier subassembly 1 has an annular connector zone 113 provided at an assembly portion 131 of the insulating body 13 in which a circular opening 141 is formed. Similarly, the negative conductor 12 has an annular connector 123 provided at an assembly portion 132 of the insulating body 13 in which a circular opening 142 is formed.

Also, the regulator subassembly 2 includes, in conventional manner, an insulating body 23 on which are mounted an integrated circuit 25 for performing regulation and a pair of brush carriers 24. This subassembly includes a positive conductor 21 connected to the integrated circuit and including an annular connector 213 having an opening 214 therethrough, and a negative conductor 22 is likewise connected to the integrated circuit and including an annular connector 223 having a through opening 224.

Two bolts (not shown) are provided to pass through respective pairs of openings 141 & 214 and 142 & 224, and co-operate with appropriate tapping formed in a back bearing of the alternator, thereby serving, for example, to clamp together the respective pairs of annular connectors 113, 213, and 123, 223, while also affixing both subassemblies to the bearing.

Thus, to make two electrical connections between the subassemblies, it is necessary to provide two distinct bolts which are spaced apart from each other, whereas from a purely mechanical point of view, a single bolts would suffice.

More generally, it is necessary to provide as many fastens points (by means of bolts or otherwise) as there are electrical connections to be made by the assembly.

This known solution is naturally expensive insofar as it requires a plurality of bolts and a plurality of associated tapped holes or nuts, thereby also lengthening the time required for assembly.

This solution is also disadvantageous in that the electrical contacts made between the two subassemblies are achieved merely by pressing together conductive surfaces, which are exposed to the environment and which therefore run the risk of corrosion and deterioration in contact quality.

Also known, from U.S. Pat. No. 5 268 605 is a device for mechanically assembling and electrically connecting together two subassemblies of an alternator, in particular a motor vehicle alternator, one of the subassemblies including at least two first conductor elements mounted on a support and the other subassembly including at least two second conductor elements mounted on a support and designed to be connected to the first conductor elements, and the supports of the first and second subassemblies include fittings designed to cooperate with clamping fasteners, said assembling means being suitable for maintaining contact pressure between corresponding contact portions of the first conductor elements and of the second conductor elements, and the contact portions of the first and second conductor elements being provided in the vicinity of one another on respective fittings suitable for receiving a single fastener.

This device makes it possible, at a single fastening point (fastening performed by a bolt, for example), to provide a plurality of electrical contacts between the two subassemblies.

The device is disadvantageous, however, in that it requires contacts to be stacked, thereby necessarily imparting considerable thickness thereto in the axial direction. Also, the contact zones are largely exposed on externally, and risks of short-circuiting is encountered, particularly in bad weather.

OBJECT AND SUMMARY OF THE INVENTION

The object of the present invention is to provide a mechanical assembly and electrical connection device of the above-specified type which is compact both axially and transversely, and which also provides good environmental protection for the surfaces to be put into contact.

The present invention thus provides a device for mechanically assembling and electrically connecting together two subassemblies of an alternator as defined above, wherein said corresponding contact portions of the first conductor elements and of the second conductor elements are arranged cirumaxially around said fastener member.

The invention also results in an alternator, including the first and second subassemblies which are mechanically assembled and electrically connected together by means of a device as defined above.

BRIEF DESCRIPTION OF THE DRAWINGS

Other aspects, objects, and advantages of the present invention appear more clearly on reading the following detailed description of a preferred embodiment thereof, given by way of example and made with reference to the accompanying drawings, in which.

MORE DETAILED DESCRIPTION

Figure 2:
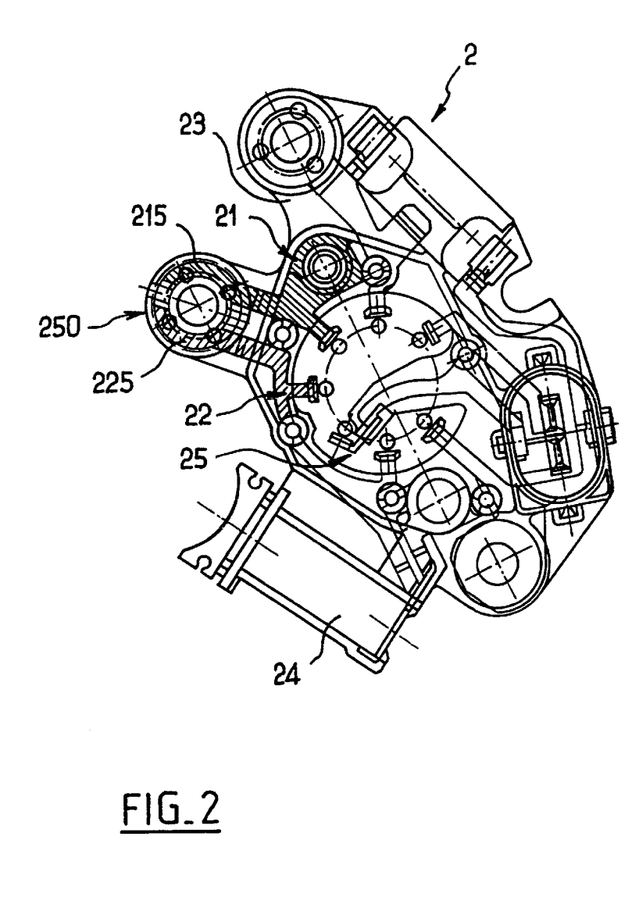
FIG. 2 is an exploded plan view of a rectifier subassembly and of a regulator subassembly of an alternator of the present invention.
Figure 3:
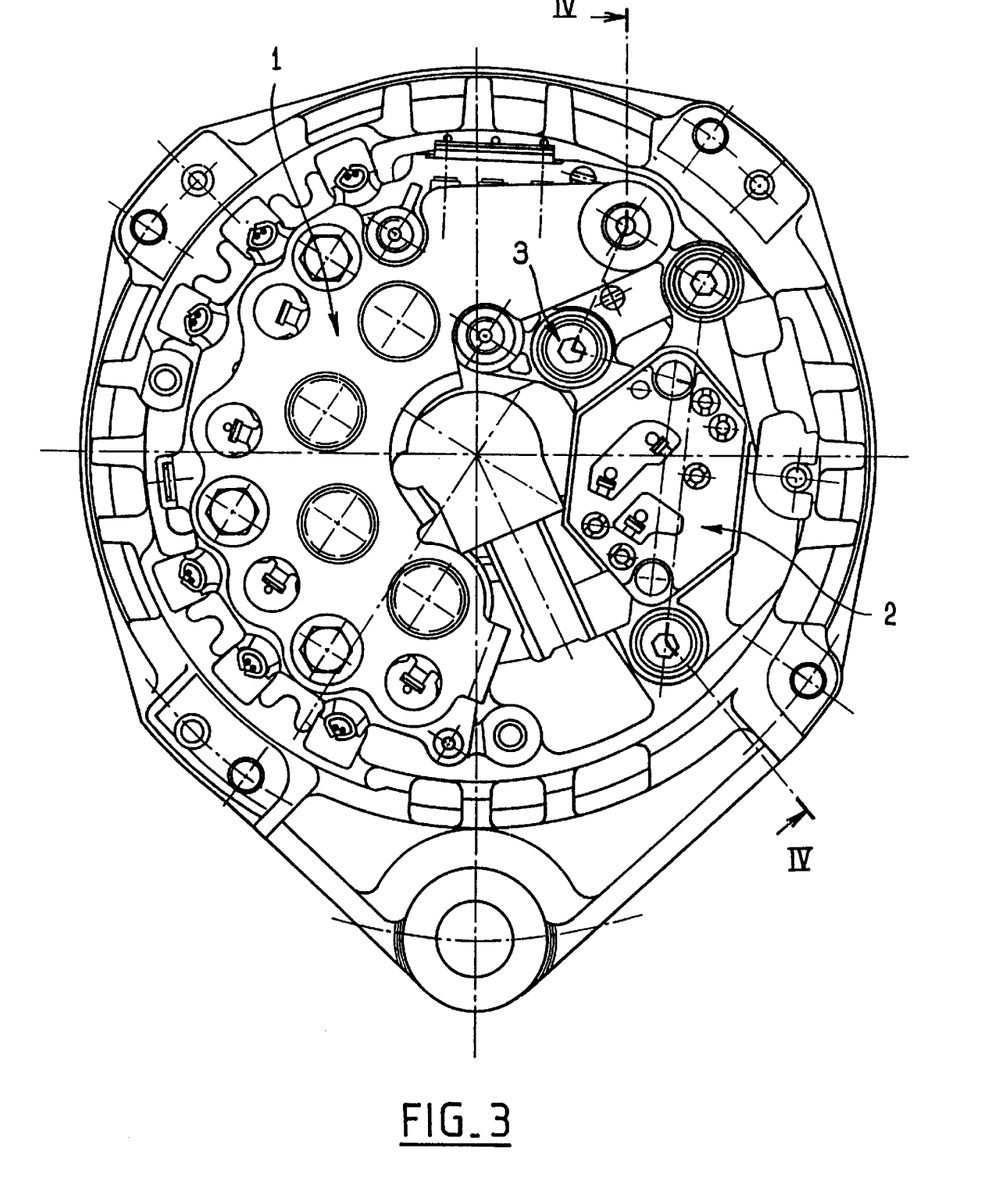
FIG. 3 is a plan view of an alternator half-case in which the two subassemblies of FIG. 2 have been assembled.
Figure 4:
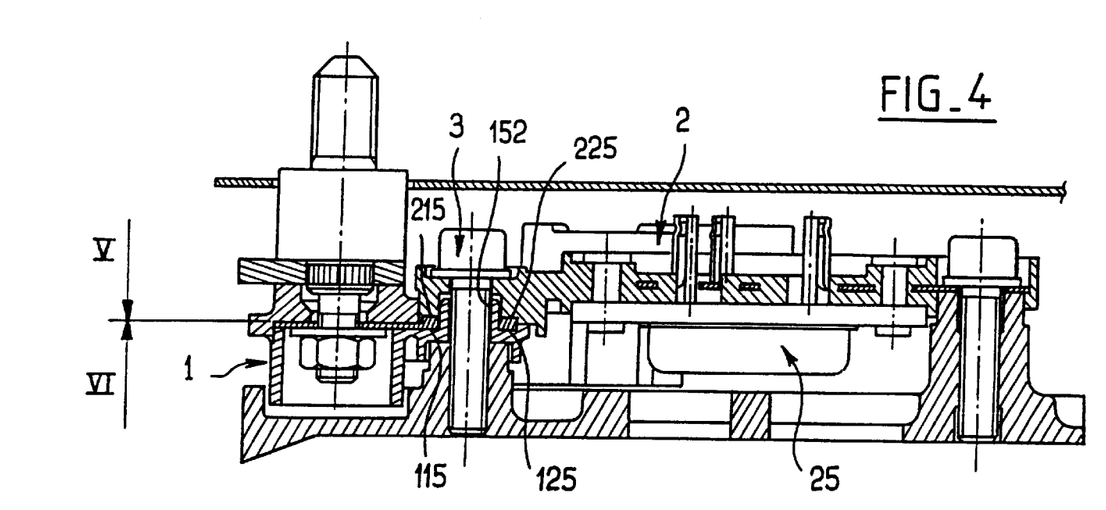
FIG. 4 is a cross-sectional view on chain-dotted line IV—IV of FIG. 3.

With reference now to FIGS. 2 to 4, two subassemblies of a motor vehicle alternator are disclosed, namely a rectifier subassembly 1 and a regulator subassembly 2.

Overall the two subassemblies are described above in the preamble, and the same reference numbers are used for elements in common. The description below is therefore restricted to the present invention for mechanically assembling and electrically connecting together the two subassemblies.

As can be seen in FIG. 2, the positive conductor 11 of the rectifier subassembly 1 includes a contact portion 115 that is generally in the form of a half-annulus, while the negative conductor 12 includes a contact portion 125 also generally in the form of a half-annulus, disposed symmetrically relative to the half-annulus 115, and facing it.

The two contact portions 115 and 125 are received in an appropriate fitting 150 of the insulating body 13 of the subassembly 1, as described below.

In analogous manner, positive and negative conductors, respectively 21 and 22, of the regulator subassembly 2 respectively include two contact portions 215 and 255 each generally in the form of a half-annulus disposed symmetrically and facing each other in spaced apart relationship. These contact portions are formed on a fitting 250 of the insulating body 23 of the subassembly 2.

The contact portions 115 and 125 are of substantially the same shape and size as the contact portions 215 and 225.

Figure 5:
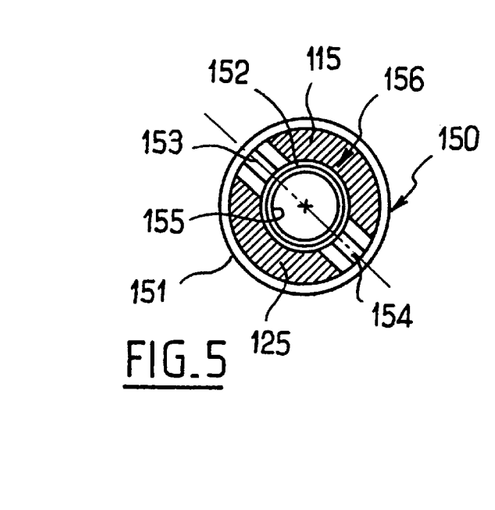
FIG. 5 is a section on line V of FIG. 4 through a fastening and contact portion of the assembly of FIGS. 3 and 4.
Figure 6:
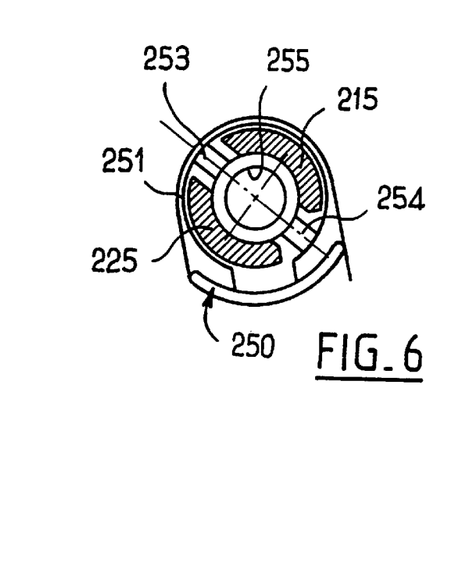
FIG. 6 is a section on line VI of a fastening and contact portion of the assembly of FIGS. 3 and 4.
Figure 7:
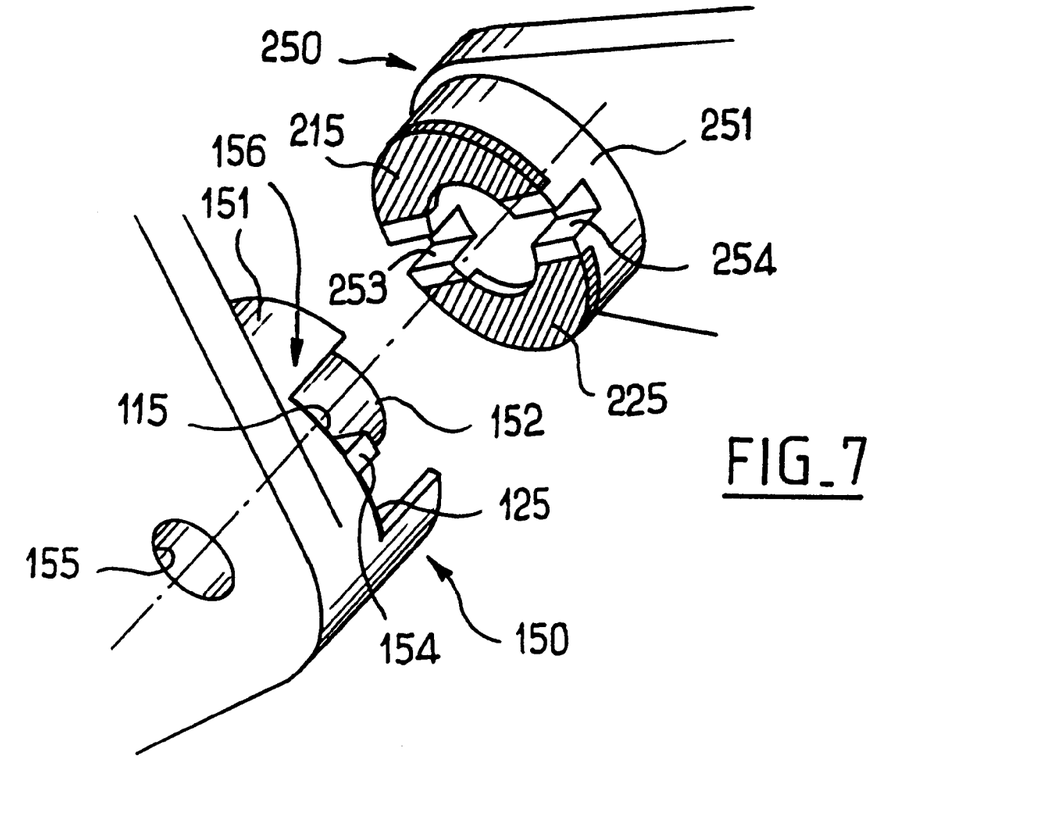
FIG. 7 is a perspective view of the fastening and contact portion of the assembly of FIGS. 3 and 4.

With reference to FIGS. 5 to 7, it can be seen that the fitting 150 of the subassembly one is constituted mainly by two concentric axial annular skirts, namely outer skirt 151 and an inner skirt 152, which together define annular cavity 156 with the two contact portions 115 and 125 preferably being flush with the bottom thereof.

Also, projecting from the bottom of the cavity 156 between the skirts 151 and 152, two diametrically opposite radial ribs 153 and 154 may be integrally formed with the fitting 150 and serve to insulate the two contact portions 115 and 125 from each other.

As best as shown in in FIG. 7, the outer skirt 151 of the fitting 150 may be interrupted adjacent the ribs 153 and 154.

Finally, the fitting 150 has a cylindrical central through hole 155 coaxial with the skirts 151 and 152 and designed to receive the shank of a single fastening bolt (reference 3 in FIGS. 3 and 4).

The fitting 250 formed on the insulating body of the subassembly 2 comprises a projecting annular ring 251 with the two contact portions 215 and 225 of the conductors 21 and 22 flush with the axial end surface thereof.

The ring 251 is complementary in shape to the cavity 156 defined in the fitting 150 of the first subassembly 1. It also has two radially-extending grooves 253 and 254 which are diametrically opposite and which separate the two contact portions 215 and 225 from each other.

A cylindrical axial through hole 255 is of a diameter close to that of the hole 155.

When the two subassemblies are to be fitted to the back bearing of an alternator, the fastening fittings 150 and 250 of the two subassemblies are mutually engaged with male/female type co-operation such that the contact portions 115 and 125 of the first subassembly come respectively into register with the contact portions 215 and 225 of the second subassembly. During this engagement, the ribs 153 and 154 enter the grooves 253 and 254 to ensure that the two half-cavities in which respective electrical connections are established are effectively separated from each other.

The bolt 3 is then inserted in the aligned holes 155 and 255 and is screwed into a tapped hole formed in the back bearing of the alternator, thereby clamping the two fittings 150 and 250 together and thus establishing appropriate electrical connection between the respective pairs of contacts 115 & 215 and 125 & 225.

Once the bolt has been tightened, the contacts are protected from the external environment, in particular by the outer skirt 151 which defines contact cavities that are closed or essentially closed. Where appropriate, it is also possible to incorporate grease in the cavities to improve protection of the contacts.

The invention makes it possible, using a single fastener element, specifically the bolt 3, to fasten together two subassemblies while also providing a plurality of electrical connections between the two subassemblies.

Naturally, the person skilled in the art will be capable of making the necessary modifications in the vicinity of the single fastener to achieve a number of connections greater than two.

It may also be observed at this point that the insulating bodies of the two subassemblies are advantageously made by being overmolded on their respective conductors.

Naturally, the present invention is not limited in any way to mechanically assembling and electrically connecting a rectifier subassembly and a regulator subassembly, and can be used with any other components of an alternator.

I claim:

1. A device for mechanically assembling and electrically connecting together two subassemblies of an alternator, in particular a motor vehicle alternator, one of the subassemblies including at least two first conductor elements mounted on a support and the other subassembly including at least two second conductor elements mounted on a support and designed to be connected to the first conductor elements, and the supports of the first and second subassemblies including fittings designed to cooperate with a single fastener, said fastener maintaining contact pressure between a pair of first contact portions of the first conductor elements and a pair of corresponding second contact portions of the second conductor elements, said first contact portions and said second contact portions being provided in the vicinity of each other on respective male/female fittings suitable for receiving said fastener, wherein one of said pairs of first and second contact portions are provided in two separate cavities provided in said female fitting and arranged circumaxially around said single fastener, while the other or said pairs of first and second contact portions are provided on two protrusions adapted to penetrate into said two cavities, respectively.

2. A device according to claim 1, wherein said cavities and protrusions are in the form of concentric ring portions.

3. A device according to claim 1, wherein the first subassembly is a rectifier subassembly of the alternator and wherein the second subassembly is a regulator and brush support subassembly of the alternator.

4. A device for mechanically assembling and electrically connecting together two subassemblies of an alternator, in particular a motor vehicle alternator, one of the subassemblies including at least two first conductor elements mounted on a support and the other subassembly including at least two second conductor elements mounted on a support and designed to be connected to the first conductor elements, and the supports of the first and second subassemblies include male-female fittings designed to cooperate with clamping fastener means and defining at least two contact cavities arranged circumaxially around said fastener member, said assembling means being suitable for maintaining contact pressure between corresponding contact portions of the first conductor elements and of the second conductor elements, and the contact portions of the first and second conductor elements being provided in the vicinity of one another on respective fittings suitable for receiving a single fastener member, wherein said corresponding contact portions of the first conductor elements and of the second conductor elements are arranged circumaxially around said fastener member, wherein said contact portions and said contact cavities are in the form of concentric ring portions, and wherein said fittings also include two opposing faces on which said contact portions are situated, of said faces including projections separating the contact portions of the conductor elements of the subassembly under consideration, and the other face having setbacks complementary to said projections and separating the contact portions of the conductor elements of said other subassembly.

5. A device for mechanically assembling and electrically connecting together two subassemblies of an alternator, in particular a motor vehicle alternator, one of the subassemblies including at least two first conductor elements mounted on a support and the other subassembly including at least two second conductor elements mounted on a support and designed to be connected to the first conductor elements, and the supports of the first and second subassemblies include male-female fittings designed to cooperate with clamping fastener means and defining at least two contact cavities arranged circumaxially around said fastener member, said assembling means being suitable for maintaining contact pressure between corresponding contact portions of the first conductor elements and of the second conductor elements, and the contact portions of the first and second conductor elements being provided in the vicinity of one another on respective fittings suitable for receiving a single fastener member, wherein said corresponding contact portions of the first conductor elements and of the second conductor elements are arranged circumaxially around said fastener member, wherein the female fitting includes an inner skirt surrounding a through hole for the fastener member, and an outer skirt situated at a distance radially from the inner skirt and co-operating therewith to define said cavities.

6. An alternator for use in a motor vehicle including a device for mechanically assembling and electrically connecting together two subassemblies of the alternator, one of the subassemblies including at least two first conductor elements mounted on a support and the other subassembly including at least two second conductor elements mounted on a support and designed to be connected to the first conductor elements, and the supports of the first and second subassemblies including fittings designed to cooperate with a single fastener, said fastener maintaining contact pressure between a pair of first contact portions of the first conductor elements and a pair of corresponding second contact portions of the second conductor elements, said first contact portions and said second contact portions being provided in the vicinity of each other on respective male/female fittings suitable for receiving said fastener, wherein one of said pairs of first and second contact portions are provided in two separate cavities provided in said female fitting and arranged circumaxially around said single fastener, while the other or said pairs of first and second contact portions are provided on two protrusions adapted to penetrate into said two cavities, respectively.

7. An alternator for use in a motor vehicle including a device for mechanically assembling and electrically connecting together two subassemblies of the alternator, one of the subassemblies including at least two first conductor elements mounted on a support and the other subassembly including at least two second conductor elements mounted on a support and designed to be connected to the first conductor elements, and the supports of the first and second subassemblies include male-female fittings designed to cooperate with clamping fastener means and defining at least two contact cavities arranged circumaxially around said fastener member, said assembling means being suitable for maintaining contact pressure between corresponding contact portions of the first conductor elements and of the second conductor elements, and the contact portions of the first and second conductor elements being provided in the vicinity of one another on respective fittings suitable for receiving a single fastener member, wherein said corresponding contact portions of the first conductor elements and of the second conductor elements are arranged circumaxially around said fastener member, wherein said contact portions and said contact cavities are in the form of concentric ring portions, and wherein said fittings also include two opposing faces on which said contact portions are situated, of said faces including projections separating the contact portions of the conductor elements of the subassembly under consideration, and the other face having setbacks complementary to said projections and separating the contact portions of the conductor elements of said other subassembly.

8. An alternator for use in a motor vehicle including a device for mechanically assembling and electrically connecting together two subassemblies of the alternator, one of the subassemblies including at least two first conductor elements mounted on a support and the other subassembly including at least two second conductor elements mounted on a support and designed to be connected to the first conductor elements, and the supports of the first and second subassemblies include male-female fittings designed to cooperate with clamping fastener means and defining at least two contact cavities arranged circumaxially around said fastener member, said assembling means being suitable for maintaining contact pressure between corresponding contact portions of the first conductor elements and of the second conductor elements, and the contact portions of the first and second conductor elements being provided in the vicinity of one another on respective fittings suitable for receiving a single fastener member, wherein said corresponding contact portions of the first conductor elements and of the second conductor elements are arranged circumaxially around said fastener member, wherein the female fitting includes an inner skirt surrounding a through hole for the fastener member, and an outer skirt situated at a distance radially from the inner skirt and co-operating therewith to define said cavities.

* * * * *

UNITED STATES PATENT AND TRADEMARK OFFICE
CERTIFICATE OF CORRECTION

PATENT NO. : 5,924,897
DATED : July 20, 1999
INVENTOR(S) : Roger Abadia

It is certified that error appears in the above-indentified patent and that said Letters Patent is hereby corrected as shown below:

Column 1, lines 30-31: After "negative", delete "conductor" and insert --conductors--.

Column 1, line 63: After "single", delete "bolts" and insert --bolt--.

Column 1, line 66: Please delete "points".

Column 3, line 40: After "subassembly", delete "one" and insert --1--.

Column 3, line 50: After "As best", delete "as".

Column 3, line 50: Delete the second occurrence of "in".

Signed and Sealed this

Fourth Day of April, 2000

Attest:

Attesting Officer

Q. TODD DICKINSON

Director of Patents and Trademarks

UNITED STATES PATENT AND TRADEMARK OFFICE
CERTIFICATE OF CORRECTION

PATENT NO. : 5,924,897
DATED : July 20, 1999
INVENTOR(S) : Roger Abadia

It is certified that error appears in the above-identified patent and that said Letters Patent is hereby corrected as shown below:

On the title page item [73], delete "Valeo Equipment Electriques Moteur" and insert --Valeo Equipement Electriques Moteur--.

Signed and Sealed this

Twenty-second Day of August, 2000

Attest:

Q. TODD DICKINSON

Attesting Officer

Director of Patents and Trademarks